2,917,372
LIQUID-GAS CONTACT REACTOR

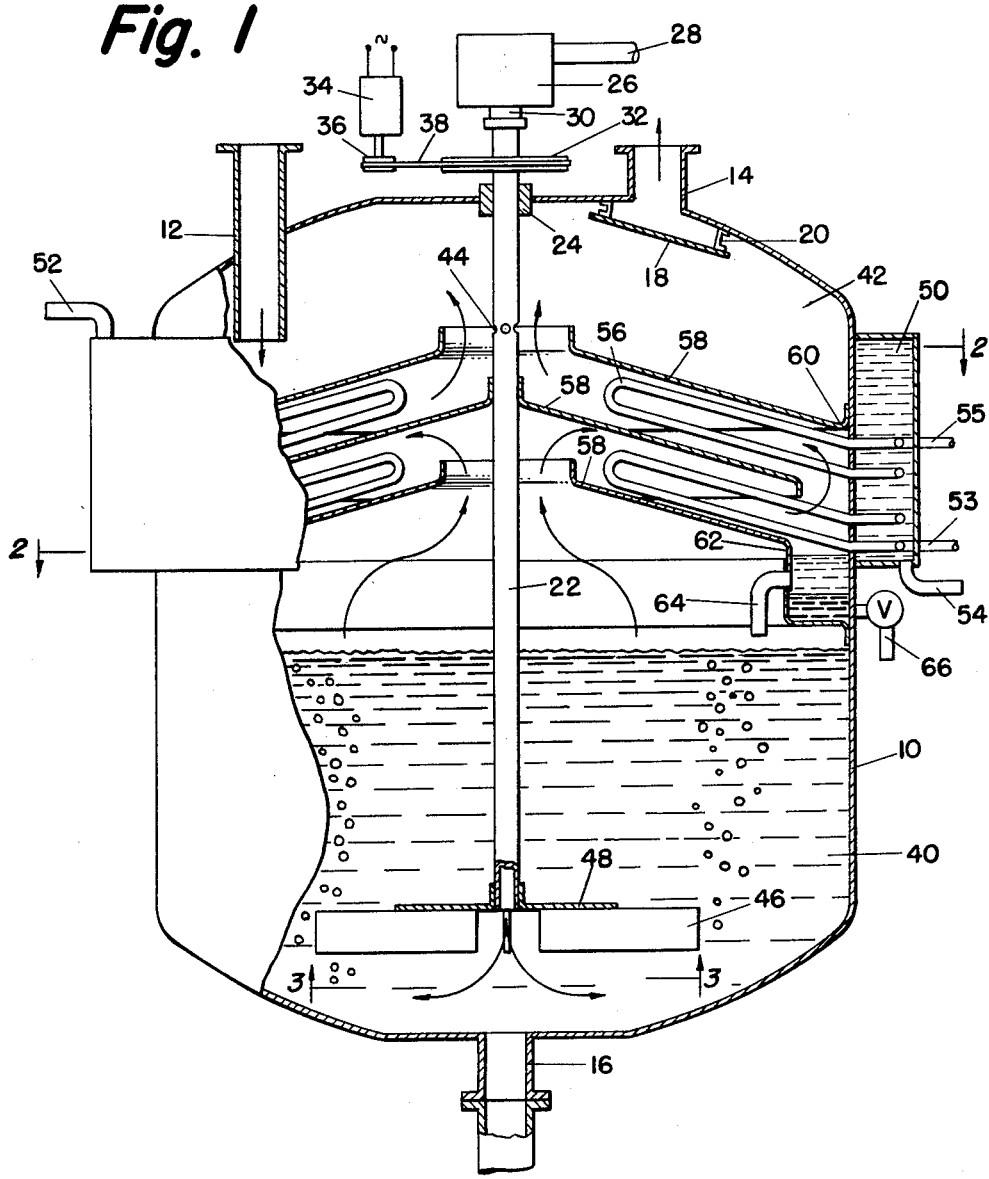

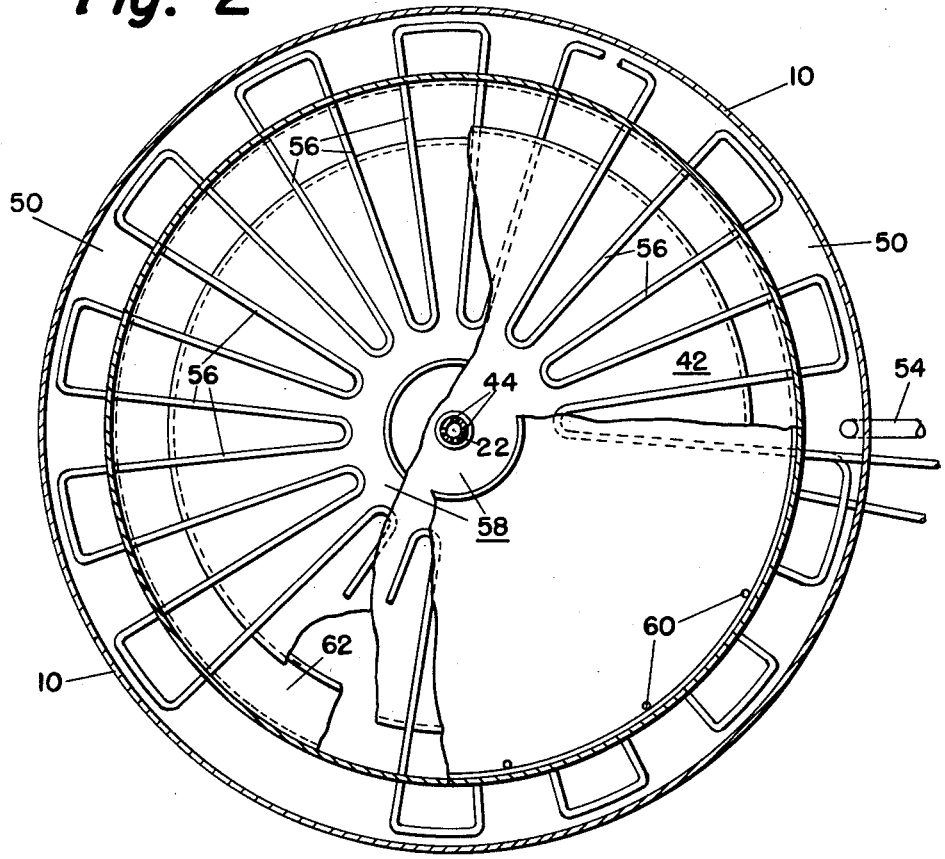
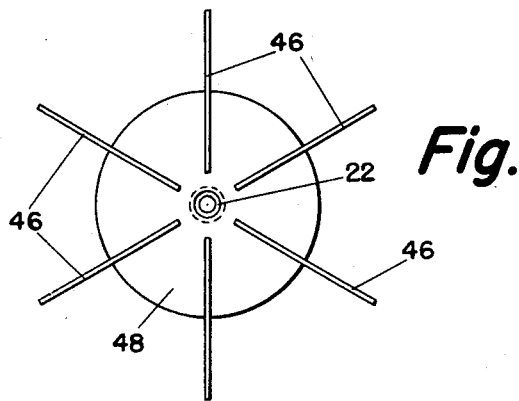

Curtiss C. Wallin, Springfield, Pa., assignor to Sun Oil Company, Philadelphia, Pa., a corporation of New Jersey Application September 12, 1958, Serial No. 760,611

7 Claims. (Cl. 23—285)

This invention relates to mixing vessels for use in the chemical and related industries and particularly to vessels used for gas-liquid contact operations to effect reaction between the gas and liquid.

The present invention has wide applicability for conducting reactions between a gas and a liquid where the reaction is carried out at a temperature at which the liquid reactant or a product of the reaction tends to vaporize. It is especially useful for conducting reactions which take place only in the liquid phase and where the solubility of the reactant gas in the reactant liquid is low so that a slow rate of solution of the gas in the liquid tends to limit the rate of reaction.

An example of the type of reaction system to which the invention has particular utility is the oxidation of liquid xylenes by gaseous oxygen to produce dibasic aromatic acids. For instance, oxygen can be contacted with a liquid mixture of m-xylene and p-xylene in the presence of a suitable catalyst to form crystalline isophthalic and terephthalic acids which will separate from solution. Water and carbon dioxide are also formed as by-products. The reaction can be conducted at the boiling point of the mixture and the heat of reaction will cause unreacted xylenes to boil, thus absorbing the released heat as heat of vaporization. In conventional practice the vaporized xylenes pass from the reactor in admixture with water vapor and excess oxygen to a condenser where the xylenes are recovered for return to the reactor. Operation in this manner is not entirely satisfactory, since the oxygen is not efficiently utilized in the reaction and a considerable amount of excess oxygen is vented from the system.

The present invention provides an improved reactor usable for the foregoing and analogous types of reactions. The reactor is so constructed that the oxygen or other reactant gas is efficiently utilized in the system while a relatively high reaction rate is still permitted to be maintained.

Briefly, the reactor comprises a liquid supporting section in the lower part of the vessel to which liquid reactant can be fed and from which reaction product can be withdrawn, and a vapor space section in the upper part of the vessel. A rotatable agitator disposed in the liquid supporting section is attached to a hollow shaft projecting through the vapor space section and through the top of the vessel. Fresh reactant gas can be fed through the hollow shaft into the liquid supporting section adjacent the agitator. Around and within the vapor space of the vessel, cooling means comprising a jacket and radially extended cooling coils inside the vapor space provide a condensing area. Baffles adjacent the internal cooling coils are provided to direct the rising vapors in a tortuous path along the coils and to direct the liquid condensate to a peripherally positioned trough inside the vessel. The trough functions as a separator to stratify the condensate into separate layers, such as a xylene layer and a water layer, and means are provided for returning one layer to the liquid supporting section and for removing the other layer from the vessel. Above the cooling coils in the vapor space the hollow shaft is apertured so that gas will be drawn in from the vapor space and forced downwardly to the liquid supporting section as the agitator rotates. This effects circulation of gas within the vessel, which gas is substantially undiluted with reactant vapor and hence is of high concentration. This promotes a high rate of reaction while minimizing loss of gas from the system. Outlet means are provided for withdrawing gas in relatively small amount from the reactor so that uncondensible gas impurities will not build up too much in the circulating reactant gas stream.

The invention is more specifically described with reference to the accompanying drawings wherein:

Figure 1 is an elevational view of the reactor partly in section;

Figure 2 is a sectional view of the device with certain parts broken away and taken on line 2—2 of Figure 1; and Figure 3 is a view of a sub-combination of the device taken on line 3—3 of Figure 1.

Referring to the drawings and particularly to Figure 1, the reactor includes a closed vessel 10 apertured as at inlet 12 to admit liquid charge stock, at 14 to vent product gases and at 16 for the draw-off of products which can be both solid and liquid as in the case where the apparatus is used for oxidizing xylenes. A baffle 18 is mounted within the vessel 10 as by a spider 20 to prevent the outward passage of entrained liquids through the product gas vent 14.

Centrally disposed in vessel 10 a hollow rotatable shaft 22 extends through a stuffing box 24 preferably in the top of the reactor, although the shaft could, if desired, be made to project through the bottom instead. A gas transfer chamber 26 connected to a delivery conduit 28, receives the top of shaft 22 through a second stuffing box 30, making a gas-tight connection while permitting shaft 22 to rotate as required for liquid agitation and resulting gas-liquid contact. A means to supply shaft rotation is symbolized here as pulley 32 mounted on the shaft 22, an electric motor 34 with a proper electrical supply indicated but not shown, and a motor mounted pulley 36 with a belt drive 38 operably connecting pulleys 32 and 36. Any form of satisfactory driving device is acceptable.

In the vapor space of vessel 10, generally understood as the upper interior section 42 of the vessel between the liquid 40 surface and the inner walls of the vessel, apertures 44 are provided in hollow shaft 22. The shaft is then extended to a suitable depth in the liquid 40 where it supports a liquid agitating means such as spaced paddles 46. As shown in Figures 1 and 3, the paddles 46 are carried by a supporting disc 48, flange-connected to shaft 22, thereby placing the paddles below the open end of hollow shaft 22.

Cooling jacket 50 is circumferentially mounted exteriorly of the vessel 10 at the elevation of the vapor space, as shown in Figures 1 and 2. An inlet 52 and outlet 54 conduct a cooling fluid to and from the jacket 50. Operably connected to jacket 50, a plurality of coils 56 enter the vessel vapor space 42 and extend inwardly toward shaft 22. These coils 56 are connected to a common inlet 53 and outlet 55 and pass through the cooling jacket 50 where either the cooling coil temperature or the jacket temperature is reduced depending on the relative temperatures of the coils and jacket. Between the several layers of such cooling coils trays 58 are arranged in staggered relation to cause the vapors to flow in a tortuous path along the coils and effect condensation of the normally liquid components. These trays are sloped downwardly from center toward the periphery of the vessel to direct the liquid condensate toward the vessel wall. Apertures, such as 60, at the lower end of any trays which engage the vessel wall allow the condensate to drain to a peripheral trough 62. An overflow pipe 64 conducts condensed reactant back to the liquid reactants 40. A valved outlet 66, which can be responsive to depth of the aqueous or "heavy" layer of condensed product collected in trough 62, provides for removing this condensate material from the system.

In operation, the above-described elements cooperate forming an efficient, economical gas-liquid contact device. The liquid charge stock is admitted to the reactor through inlet 12. Gas initially required to start the reaction is injected through any of the openings described. Make-up quantities of the reactant gas needed as the process continues are transmitted from delivery conduit 28 through chamber 26 to hollow shaft 22. Sufficient pressure causes the gas to enter hollow shaft 22 overcoming the vapor space pressure in vessel 10 transmitted to the hollow portion of the shaft through apertures 44.

The rotation of hollow shaft 22 facilitates the introduction of make-up quantities of gas by causing gas to circulate down the shaft into the liquid as the shaft rotates. Paddles 46 rotate with shaft 22 and agitate liquid 40. As these paddles are positioned below the open end of shaft 22, the liquid is agitated adjacent to the opening and sets up an area of reduced pressure drawing the gas downwardly through the hollow shaft. Once expelled into the liquid the gas rises as bubbles, indicated in Figure 1. In this way the gas is mixed thoroughly with the liquid. By having apertures 44 located in the vapor space of vessel 10 above the cooling zone where normally liquid components are condensed, the recirculated reactant gas is maintained at high concentration and the gas is repeatedly re-used, thus requiring much smaller quantities of fresh gas to carry out the reaction process.

An example of one application of this device is in the oxidation of xylenes as previously suggested. Oxygen is the gas used in this example, and the reaction mixture contains xylenes, oxidation products and a soluble catalyst. As the oxygen is contacted with the liquid as described above, the liquid is raised in temperature to its boiling point and vaporizes. The vapor rises in the vapor space of the vessel and is baffled into contact with cooling coils 56 by staggered baffles 58. The condensible vapors, which are principally xylenes, are condensed and drop to the baffles, draining toward the vessel peripheral wall. Trough 62 catches the liquid and permits it to stratify into an upper xylene layer, which is returned through line 64 to the liquid body for further reaction, and a water layer which is removed from the system through line 66. A portion of the circulating gas is rejected from the system by withdrawing it around baffle 18, through spider 20 and out the outlet 14 so as to maintain the oxygen concentration of the gas contacting the liquid xylenes sufficiently high to maintain the desired rate of reaction. The reaction mixture can be continuously removed from the reactor through line 16 and filtered to separate the crystalline phthalic acids, and the filtrate xylenes can be recycled to the reactor along with fresh xylenes through line 12.

From the above description of elements and their cooperation it will be evident that the reactor of this invention has broad use in exothermic reactions requiring continuous gas-liquid contacting with gas of the highest purity possible. Such a device is particularly useful where the solubility of the reactant gas in the reactant liquid is low, the cost of the reactant gas is high, the reaction takes place only in the liquid phase, and the overall reaction rate is mass transfer limited.

I claim:

1. An apparatus for mixing gas and liquid comprising a closed vessel adapted to receive the liquid and gas to be mixed, a rotatable hollow shaft positioned vertically in the vessel and extending through an end thereof, the upper portion of the shaft within the vessel being apertured for flow of gas from the vapor space in the upper portion of the vessel downwardly through the shaft as it is rotated, agitating means on the lower portion of the shaft, a plurality of cooling coils vertically spaced apart in the vapor space in the upper portion of the vessel and completely separated from the liquid in the lower portion of the vessel, baffles under each of said vertically spaced cooling coils sloping downwardly toward the periphery of the vessel and positioned to direct rising gases in a tortuous path along the cooling coils and to direct condensed liquid toward the periphery of the vessel, a liquid collection trough positioned adjacent the periphery of the vessel to receive condensed liquid, and means for returning condensed liquid from said trough to the lower portion of said vessel.

2. Apparatus according to claim 1 including means for separately withdrawing liquid from the lower part of said trough for removal from the vessel.

3. An apparatus for contacting gas and liquid to effect reaction thereof comprising a closed vessel adapted to receive reactant liquid and gas and providing a liquid supporting lower section and a vapor space upper section, a rotatable hollow shaft extending sealingly through the top of the vessel into the liquid supporting lower section, said shaft having an open lower end and being apertured adjacent the vapor space upper section for flow of gas therefrom downwardly through the hollow shaft into the liquid supporting lower section when the shaft is rotated, agitating means carried by the hollow shaft in the lower section of the vessel, cooling means in the vapor space of the vessel positioned to contact rising vapors only, baffle means between the cooling means and the liquid supporting section adapted to intercept liquid condensed from the vapors, and condensate control means cooperating with said baffle means to return reactant liquid to the liquid supporting section and to discharge other condensate from the vessel.

4. Apparatus according to claim 3 wherein said agitating means includes a plurality of circumferentially spaced, radially extending blades attached to rotate with the hollow shaft and positioned to project below the open end of the shaft.

5. Apparatus according to claim 3 including means for introducing fresh reactant gas into the upper end of said hollow shaft and means adjacent the vapor space upper section for removing excess gas from the vessel.

6. Apparatus according to claim 3 including a jacket for cooling fluid exteriorly positioned of the vessel around the vapor space, and a plurality of cooling coils connected through the wall of the vessel to the jacket and extending radially into the vapor space in spaced circumferential arrangement about the hollow shaft.

7. Apparatus according to claim 3 wherein the condensate control means includes a trough positioned between the liquid supporting section of the vessel and said baffle means to receive the condensate, a tubular outlet connected to a lower part of the trough through the wall of the vessel for removing said other condensate, and overflow tubes positioned to return reactant liquid from the trough to the liquid supporting section.

References Cited in the file of this patent

UNITED STATES PATENTS

| | | |
|---|---|---|
| 1,242,445 | Ittner | Oct. 9, 1917 |
| 1,257,400 | Robinson | Feb. 26, 1918 |
| 1,307,588 | Lane | June 24, 1919 |